United States Patent [19]

Marling

[11] 4,025,408
[45] May 24, 1977

[54] DEUTERIUM SEPARATION BY INFRARED-INDUCED ADDITION REACTION

[75] Inventor: John B. Marling, Livermore, Calif.

[73] Assignee: The United States of America as represented by the United States Energy Research and Development Administration, Washington, D.C.

[22] Filed: May 28, 1976

[21] Appl. No.: 691,258

[52] U.S. Cl. .................. 204/163 R; 423/648 A; 250/284; 250/423 P; 204/DIG. 11
[51] Int. Cl.$^2$ .................. B01J 1/10; B01D 59/34
[58] Field of Search ............ 204/163 R, DIG. 11; 423/648; 250/284, 423 P

[56] References Cited
OTHER PUBLICATIONS

*Chemical Physics Letters* 1975, 34(1), pp. 84–89.
*Soviet Atomic Energy* 1973, 33(4), p. 961.

Primary Examiner—Richard E. Schafer
Assistant Examiner—E. Suzanne Parr
Attorney, Agent, or Firm—Dean E. Carlson; Roger S. Gaither; Irene S. Croft

[57] ABSTRACT

A method for deuterium enrichment by the infrared-induced addition reaction of a deuterium halide with an unsaturated aliphatic compound. A gaseous mixture of a hydrogen halide feedstock and an unsaturated aliphatic compound, particularly an olefin, is irradiated to selectively vibrationally excite the deuterium halide contained therein. The excited deuterium halide preferentially reacts with the unsaturated aliphatic compound to produce a deuterated addition product which is removed from the reaction mixture.

15 Claims, 1 Drawing Figure

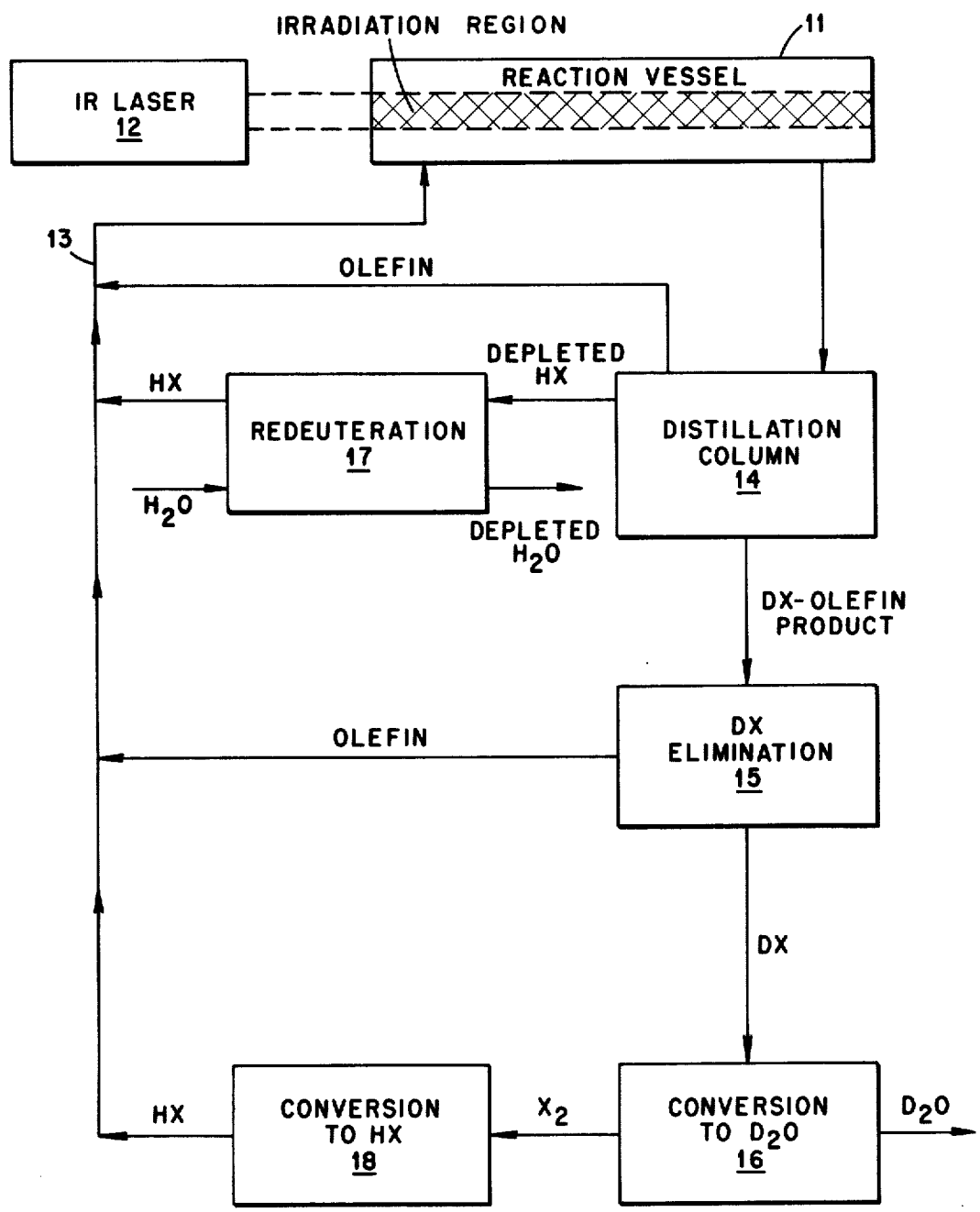

DEUTERIUM SEPARATION BY INFRARED-INDUCED ADDITION REACTION

The invention described herein was made in the course of, or under, Energy Research and Development Administration Contract No. W-7405-ENG-48 with University of California.

BACKGROUND OF THE INVENTION

This invention relates to a method for the separation of hydrogen isotopes. More particularly, this invention relates to a method for deuterium enrichment by an infrared single-photon induced addition reaction.

Several processes for isotope separation make use of the isotope shift, that is, a slight shift of the lines in the absorption spectra of elements or molecular species due to the small difference in nuclear mass of the isotopes of the same element contained therein. Changes in nuclear mass can cause a shift in electronic, vibrational, and rotational energy levels. When the shift places the absorption line of one isotopic species at a frequency at which the others are transparent, it is possible to excite selectively that species with a source of radiation of sufficiently narrow width.

A common feature of all separation methods based on the isotope shift is the selective excitation of one of the isotopic species by radiation, particularly laser radiation, tuned to a specific absorption line, followed by a physical or chemical process which acts on excited species and separates them from unexcited ones. The physical or chemical separation process may or may not require the absorption of an additional photon.

Photochemical isotope separation processes involve radiation of a chemical system with monochromatic radiation under a set of circumstances which will cause chemical change or reaction preferentially to one isotopic variety of a molecular species. Mercury, carbon, oxygen, and chlorine have been enriched photochemically. C. B. Moore, *Accounts of Chemical Research* 6, 323 (1973) describes the separation of hydrogen, carbon, and oxygen isotopes by the photopredissociation of formaldehyde.

Recent work has verified the usefulness of formaldehyde photodissociation as a simple and effective route to separation of deuterium, carbon and oxygen isotopes (J. B. Marling, "Laser Isotope Separation of Deuterium", *Chem. Phys. Lett.* 34, 84, 1974, and J. B. Marling, "Laser Enrichment of Oxygen-18 and Carbon-13 by Formaldehyde Photo-predissociation", UCRL-77521, December 1975). However, in the case of deuterium this process requires highly monochromatic nearultraviolet photons and economic considerations force laser efficiency to exceed 1%. This is an order of magnitude higher than what can be confidently achieved with present technology. Deuterium production by UV lasers would require an average optical power of at least 1 kilowatt per ton/year $D_2O$ production, or a fractional megawatt of UV for a typical industrial sized plant. This cannot be easily envisioned from the presently available laser technology. The need exists for a highly selective photochemical process for the separation of deuterium which utilizes established high performance infrared lasers.

SUMMARY OF THE INVENTION

It is, therefore, an object of this invention to provide an improved photochemical process for the separation of isotopes of hydrogen.

More particularly, it is an object of this invention to provide a process for deuterium enrichment by an infrared induced addition reaction with an unsaturated aliphatic compound.

A more specific object of this invention is to provide a process for deuterium enrichment by a hydrogen halide addition reaction with an olefin induced (catalyzed) by absorption of one or more infrared photons.

Other objects and advantages will become apparent from the following descriptions.

According to the present invention, a gaseous mixture of a hydrogen halide (HX) feedstock and an unsaturated aliphatic compound is irradiated to selectively vibrationally excite those molecules of the feedstock containing the desired isotope of hydrogen to a predetermined vibrational level. The excited molecules preferentially react with the unsaturated aliphatic compound to form a product enriched in the desired isotope. The enriched product is separated from the reaction system by standard chemical procedures.

Herein, the term "hydrogen" is used generically to include all of the isotopes of hydrogen and the terms "protium", "deuterium", and "tritium" are used to designate the specific isotopes $^1H$, $^2H$, and $^3H$, respectively. Also, the term "aliphatic" is used to include cycloaliphatic compounds.

In general, unsaturated aliphatic compounds characterized by activation energies for ground state hydrogen halide addition of less than about 40 Kcal/mole, preferably less than about 30 Kcal/mole, will react with the excited molecules sufficiently rapidly for effective separation.

More specifically, a gaseous mixture of a hydrogen halide feedstock particularly hydrogen chloride, hydrogen bromide or hydrogen iodide, and an unsaturated aliphatic compound, such as a simple alkene or an alkyne, is irradiated to selectively vibrationally excite deuterium halide (DX) molecules to a predetermined vibrational level. The vibrationally excited molecules of DX preferentially react with the unsaturated aliphatic hydrocarbon to form a deuterium tagged product. The preferred hydrogen halides are HBr and HI since excellent spectral coincidences exist with CO laser transitions to sequentially excite the $\nu = 1, 2, 3 \ldots$ vibrations in DBr and DI. The deuterium tagged product is separated from the reaction system by conventional methods. By a conventional elimination reaction, the addition product can be dissociated into a halide enriched in deuterium and the unsaturated aliphatic hydrocarbon The unsaturated hydrocarbon scavenger can be returned to the reaction system.

BRIEF DESCRIPTION OF THE DRAWING

The accompanying FIGURE is a flow diagram representing the process of the present invention.

DETAILED DESCRIPTION OF THE INVENTION

The present process can be represented by the following equations:

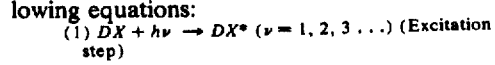
(1) $DX + h\nu \rightarrow DX^* \ (\nu = 1, 2, 3 \ldots)$ (Excitation step)

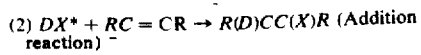
(2) $DX^* + RC=CR \rightarrow R(D)CC(X)R$ (Addition reaction)

For the excitation step excellent coincidences exist for both $D^{79}Br$ and $D^{81}Br$ with CO laser lines. DI has an excellent match with the $^{13}C^{16}O$ laser at 1677.416 cm$^{-1}$ to within 0.02 cm$^{-1}$ and 2 lesser quality matches to within 0.08 cm$^{-1}$ with the normal CO laser. Known laser matches to deuterium halides are given in Table I.

Table I

| | Laser Match to Deuterium Halides | | | |
|---|---|---|---|---|
| CO Laser | Transition (Vacuum Wavenumbers) | Deuterium Halide | (*Best matches) DX Transition | |
| P(10)$_{7-6}$ | 1921.805 cm$^{-1}$ | D$^{79}$Br | 1-0 R(10) | 1921.75 cm$^{-1}$ |
| *P(9)$_{14-13}$ | 1747.707 | D$^{79}$Br | 1-0*P(10) | 1747.68 |
| P(12)$_{7-6}$ | 1939.530 | D$^{81}$Br | 1-0 R(13) | 1939.60 |
| *P(14)$_{11-10}$ | 1804.335 | D$^{81}$Br | 1-0*P(4) | 1804.35 |
| P(8)$_{14-13}$ | 1776.555 | D$^{81}$Br | 1-0 P(7) | 1776.47 |
| P(12)$_{20-19}$ | 1612.485 | DI | 1-0 R(1) | 1612.410 |
| P(9)$_{18-17}$ | 1672.658 | DI | 1-0 R(12) | 1672.753 |
| *P(20)$_{15-14}$ | 1677.416 13$_c$16$_0$ | DI | 1-0*R(13) | 1677.433 |
| P(11)$_{9-8}$ | 1892.263 | D$^{79}$Br | 2-1,R(13) | 1892.35 cm$^{-1}$ |
| P(9)$_{10-9}$ | 1874.452 | D$^{79}$Br | 2-1,R(10) | 1874.37 |
| P(10)$_{17-16}$ | 1693.996 | D$^{79}$Br | 2-1,P(11) | 1693.93 |
| P(11)$_{8-7}$ | 1917.861 | D$^{81}$Br | 2-1,R(18) | 1917.83 |
| P(8)$_{13-12}$ | 1801.858 | D$^{81}$Br | 2-1,R(0) | 1801.90 |
| P(9)$_{16-15}$ | 1722.606 | D$^{81}$Br | 2-1,P(8) | 1722.66 |
| Holmium-YAG Laser | 2.13 microns* | DI | 3-0,R(2) | 4695.818 |

*Temperature tuned to DI R(2) or R(3) coincidence.

Absorption of the CO lasers is easily achieved at a typical DX reaction pressure of 1 atmosphere because the pressure-broadened linewidth is about 0.08 cm$^{-1}$ for DBr and about 0.04 cm$^{-1}$ for DI (semi-half-widths).

Rapid reaction of the excited DX molecules with the unsaturated aliphatic compound is necessary for effective separation. In general, compounds with activation energies (with ground state hydrogen halide) of less than about 40 Kcal/mole, particularly less than 30 Kcal/mole are required. As indicated in Table II, this condition is satisfied by the simple olefins and alkadienes.

TABLE II

| | Arrhenius Parameters for Addition of HX to Olefins: | | | | | |
|---|---|---|---|---|---|---|
| | | | | | HX+Olefin →RX | |
| | HCl$^a$ | | HBr$^a$ | | HI$^a$ | |
| Olefin | A | Ea | A | Ea | A | Ea |
| C$_2$H$_4$ | 2×10$^8$ | 40 | 2×10$^8$ | 33.9 | 3×10$^8$ | 28.5 |
| C$_3$H$_6$$^b$ | 6×10$^7$ | 33.8 | 1×10$^8$ | 28.7 | 8×10$^7$ | 23.5 |
| Iso-C$_4$H$_8$$^c$ | 1×10$^8$ | 25.4 | 3×10$^8$ | 23.2 | 4×10$^8$ | 18.1 |
| 1,3-Butadiene | | | 1×10$^8$ | 24* | 1×10$^8$ | 19.2 |
| 1,3-Pentadiene | | | 5×10$^7$ | 20* | 5×10$^7$ | 14.7 |
| 2-Methyl-1,3-butadiene | | | 3×10$^7$ | 18* | 3×10$^7$ | 13.2 |
| 4-Methyl-1,3-pentadiene | | | 3×10$^6$ | 15* | 4×10$^6$ | 10* |

*Estimated values
$^a$A has units liter/mole . sec
$^b$Reaction product is isopropyl - X
$^c$Reaction product is tert-butyl-X Other suitable compounds include cyclopentadiene, propadiene (allene), methylacetylene and the like. In general, alkenes (used herein to include alkadienes, cycloalkenes and cycloalkadienes) and alkynes of less than about 7 carbon atoms can be selected for activation energies in the approximately 10– 30 Kcal/mole range.

Naturally, the lower Ea values are more appropriate to facilitate more rapid reaction with the deuterium halide. The theoretical difference in reaction rate of the $\nu = 1$ excited DX is e$^{h\nu/kT} \approx 10^4$, the ratio of laser to thermally supplied energy, and is the maximum possible isotopic selectivity for $\nu = 1$ excited DX. By exciting the deuterium halide to higher vibrational levels, exponentially faster reaction rates are achieved. Excitation of the $\nu = 2$ level is possible either via direct single excitation from the $\nu = 0$ level or by a two step excitation via the $\nu = 1$ level. The $\nu = 3$ level can be excited directly by the holmium-YAG (yttrium-aluminum-garnet) laser as shown in Table I or by the sequential absorption of 3 CO laser supplied quanta. The holmium-YAG laser is an excellent (4% efficient) source of the required IR photons. Excitation of the $\nu = 4$ level can occur by direct excitation of $\nu = 3$ by a holmium-YAG laser followed by CO laser excitation from $\nu = 3$ to $\nu = 4$. Also feasible is two step excitation via the $\nu = 2$ level or sequential absorption of 4 CO laser supplied quanta.

The process of the present invention is schematically illustrated in the flow diagram of the accompanying figure. Referring to the drawing, numeral 11 represents a reaction vessel provided with suitably transparent ports or windows for transmission of the laser radiation and containing a gaseous mixture of HX and an olefin. Numeral 12 represents a suitable infrared (IR) laser or system of lasers emitting at a predetermined frequency or frequencies to selectively excite the DX molecules in the feedstock to the corresponding predetermined vibrational energy level. The gaseous mixture in vessel 11 is subjected to radiation from laser source 12 whereupon the DX molecules in the feedstock are selectively excited to the predetermined vibrational energy level. Typical reaction pressure is about 1 atmosphere of hydrogen halide. The temperature in the reaction zone need only be sufficient to maintain the reaction components in the vapor phase. Generally, the temperature in the reaction vessel will be in the range of from about −100° C to 200° C, depending upon the particular components of the reaction mixture.

Vibrational excitation enhances the bimolecular addition reaction of hydrogen halide to olefin; thus, the excited DX molecules preferentially react with the olefin to form a DX-olefin addition product, leaving the unexcited molecules, principally protium halide, substantially unreacted. The irradiated gaseous mixture thus consists of depleted HX, unreacted olefin, and a DX-olefin addition product (i.e., a deuterated alkyl halide), which constituents are readily separable by conventional means as by fractional distillation.

The irradiated mixture is then transferred to distillation column 14 for separation of constitutents. The separated unreacted olefin is returned to reaction vessel 11 via line 13 for further reaction with excited DX molecules. The DX-olefin addition product is introduced into reaction vessel 15 for dissociation into DX and olefin by a dehydrohalogenation reaction or an elimination reaction (the reverse of the addition reaction). The resulting olefin is returned to reaction vessel 11 for further reaction with excited DX. The DX from reaction vessel 15 is introduced into conversion vessel 16 where it is combusted by a conventional Deacon process to produce halogen and water enriched in D$_2$0. The halogen is converted to HX in conversion vessel 18 by a reverse Deacon process and returned to vessel 11 for further reaction. Depleted HX from distillation column 14 is conducted to redeuteration stage 17 where exchange with water occurs for redeuteration of feedstock. Additional olefin may be added to line 13 as required to make up for losses in the system.

The amount of unsaturated aliphatic compound used in the process need only be sufficient to react with the excited species. Naturally occurring hydrogen contains less than 0.02% of the deuterium isotope. For a natural isotopic abundance hydrogen halide feedstock an olefin: hydrogen halide mole ratio in the range of from about 0.001:1 to about 0.1:1 is sufficient.

EXAMPLE

As a specific example of the process of the present invention, natural isotopic abundance hydrogen bromide is utilized as the deuterium source and 1,3-pentadiene is the unsaturated aliphatic compound. A CO laser is used to excite DBr to $\nu = 2$ by sequential absorption of two photons.

The 1,3-pentadiene and hydrogen bromide are vaporized and mixed in a mole ratio of about 0.01:1. The gaseous mixture is flowed through a reaction tube at a rate such that the mixture in the tube is replaced approximately every 10 seconds. Hydrogen bromide pressure in the reaction tube is approximately 1 atmosphere. The temperature in the reaction vessel is in range of from about $-30°$ C to $0°$ C.

The gaseous mixture in the reaction vessel is subjected to laser pulses from two CO lasers to selectively excite DBr to the $\nu = 2$ level as follows: 1-0 DBr excitation by CO laser $P(14)_{11-10}$ at 1804.335 cm$^{-1}$; 2-1 DBr excitation by CO laser $P(8)_{13-12}$ at 1801.858 cm$^{-1}$. The laser pulses occur simultaneously with 100 nanosecond duration at 5000 pps. Average laser power required is 5 watts/liter of gaseous mixture in the reaction vessel; peak power required (Q-switched) is 10 kW/cm$^2$.

The irradiated gaseous mixture from the reaction zone is fractionally distilled to recover an HBr-1,3-pentadiene addition product enriched in deuterium. The resulting addition product is dehydrohalogenated to give HBr enriched in deuterium. Enrichment in a single pass is greater than 100-fold. Quantum efficiency for the reaction exceeds about 1%.

Although 1,3-pentadiene was used in the above example, the methyl-substituted 1,3-pentadienes, that is, 2-,3-, or 4-methyl-1,3-pentadiene are also suitable. Other suitable unsaturated aliphatic compounds include 2-methyl-1,3-butadiene (isoprene), 1,3-cyclopentadiene, and 1,3-cyclohexadiene.

Deuterium halide lasers in which the halide matches the halide of the feedstock are particularly effective for the excitation step, especially for pumping the system to the higher levels, since spectral coincidences are automatically assured.

It is to be emphasized that the present isotope separation process utilizes IR lasers such as CO and holmium-YAG lasers which have demonstrated high average power and high efficiency. Additionally, in particular modes of operation, only a single IR photon is used in the excitation step. Another advantage of the present process is that the isotope source material and the scavenging compound are common, inexpensive industrial materials. Also, the addition product formed has a substantially lower vapor pressure than the reactants and consequently is readily separated from the reactants by fractional distillation. Still another advantage is that the deuterium-carrying species, hydrogen halide, rapidly exchanges with water for redeuteration of feedstock.

Although the invention has been described specifically with reference to deuterium enrichment, the present process is also applicable to tritium enrichment in which case the tritium halide in the feedstock is selectively vibrationally excited to a predetermined energy level for preferential reaction with the unsaturated aliphatic compound.

While a specific example and operational sequence for carrying out the invention have been described, modifications and changes will become apparent to those skilled in the art, and it is intended to cover in the appended claims all such modifications and changes as come within the spirit and scope of the invention.

What I claim is:

1. A method for separating isotopes of hydrogen which comprises:
   providing a gaseous mixture comprising a hydrogen halide in which hydrogen is present in a plurality of isotopes and an unsaturated aliphatic compound characterized by an activation energy for ground state hydrogen halide addition of less than about 40 Kcal/mole;
   subjecting said mixture to radiation at a predetermined photon energy to excite those molecules of hydrogen halide containing a desired isotope of hydrogen to a predetermined vibrational energy level corresponding to said predetermined photon energy without substantially exciting those molecules of hydrogen halide containing an undesired isotope of hydrogen, the excited molecules thereby preferentially reacting with said unsaturated aliphatic compound by an addition reaction to produce an addition product enriched in the desired isotope; and
   separating the resulting addition product enriched in the desired isotope from the reaction mixture.

2. A method according to claim 1 wherein the desired isotope is deuterium.

3. A method according to claim 1 wherein the radiation is laser radiation.

4. A method according to claim 1 wherein said unsaturated aliphatic compound is characterized by an activation energy for ground state hydrogen halide addition in the range of from about 10 to about 30 Kcal/mole.

5. A method according to claim 1 wherein said hydrogen halide is selected from hydrogen chloride, hydrogen bromide, and hydrogen iodide.

6. A method for deuterium enrichment which comprises:
   providing a gaseous mixture comprising a hydrogen halide feedstock containing molecules of deuterium halide and an unsaturated aliphatic hydrocarbon characterized by an activation energy for ground state hydrogen halide addition in the range of from about 10 to about 30 Kcal/mole;
   subjecting said mixture to laser radiation at a predetermined photon energy to selectively excite the molecules of deuterium halide to a corresponding predetermined vibrational energy level, the excited molecules thereby preferentially reacting with said aliphatic hydrocarbon to produce a deuterium enriched addition product; and
   separating said deuterium enriched addition product from the reaction mixture.

7. A method according to claim 6 wherein the predetermined vibrational energy level is the $\nu = 1$ level.

8. A method according to claim 7 wherein the radiation is supplied by a CO laser.

9. A method according to claim 6 wherein the predetermined vibrational energy level is selected from the group consisting of $\nu = 2$ and $\nu = 3$ and is accessed in a single excitation step.

10. A method according to claim 9 wherein the predetermined vibrational energy level is $\nu = 3$ and the radiation is supplied by a holmium-YAG laser.

11. A method according to claim 6 wherein the predetermined vibrational energy level is higher than 1 and is accessed in at least two successive energy stages.

12. A method according to claim 11 wherein selective excitation is achieved by successive absorption of CO laser supplied photons.

13. A method according to claim 6 wherein the unsaturated aliphatic hydrocarbon is selected from the group consisting of 1,3-pentadiene; methyl-substituted 1,3-pentadienes; 1,3-cyclopentadiene; and 1,3-cyclohexadiene.

14. A method according to claim 6 wherein the hydrogen halide feedstock is selected from hydrogen chloride, hydrogen bromide, and hydrogen iodide.

15. A method according to claim 6 wherein the radiation is supplied by a deuterium halide laser wherein the halide matches the halide of the hydrogen halide feedstock.

* * * * *